(12) United States Patent
Chen et al.

(10) Patent No.: US 10,152,797 B2
(45) Date of Patent: Dec. 11, 2018

(54) METHOD FOR CO-SEGMENTATING THREE-DIMENSIONAL MODELS REPRESENTED BY SPARSE AND LOW-RANK FEATURE

(71) Applicant: BEIHANG UNIVERSITY, Beijing (CN)

(72) Inventors: Xiaowu Chen, Beijing (CN); Kan Guo, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 98 days.

(21) Appl. No.: 15/448,540

(22) Filed: Mar. 2, 2017

(65) Prior Publication Data
US 2018/0012361 A1 Jan. 11, 2018

(30) Foreign Application Priority Data
Jul. 7, 2016 (CN) .......................... 2016 1 0534020

(51) Int. Cl.
*G06K 9/34* (2006.01)
*G06T 7/11* (2017.01)
(Continued)

(52) U.S. Cl.
CPC .................. *G06T 7/11* (2017.01); *G06T 7/60* (2013.01); *G06T 17/00* (2013.01); *G06T 2200/04* (2013.01)

(58) Field of Classification Search
CPC ....... G06T 7/11; G06T 2200/04; G06T 19/00; G06T 2207/20112; G06T 2207/20072;
(Continued)

(56) References Cited

U.S. PATENT DOCUMENTS

2012/0041722 A1* 2/2012 Quan ...................... G06T 17/05
703/1

FOREIGN PATENT DOCUMENTS

CN 103218818 A 7/2013
CN 104992430 A 10/2015
(Continued)

OTHER PUBLICATIONS

Cheng et al.; "Multi-task Low-rank Affinity Pursuit for Image Segmentation"; International Conference on Computer Vision, Nov. 6-13, 2011, Barcelona Spain; pp. 2439-2446.*
(Continued)

*Primary Examiner* — Eueng-Nan Yeh
(74) *Attorney, Agent, or Firm* — J.C. Patents

(57) ABSTRACT

Presently disclosed is a method for co-segmenting three-dimensional models represented by sparse and low-rank feature, comprising: pre-segmenting each three-dimensional model of a three-dimensional model class to obtain three-dimensional model patches for the each three-dimensional model; constructing a histogram for the three-dimensional model patches of the each three-dimensional model to obtain a patch feature vector for the each three-dimensional model; performing a sparse and low-rank representation to the patch feature vector for the each three-dimensional model to obtain a representation coefficient and a representation error of the each three-dimensional model; determining a confident representation coefficient for the each three-dimensional model according to the representation coefficient and the representation error of the each three-dimensional model; and clustering the confident representation coefficient of the each three-dimensional model to co-segment the each three-dimensional model respectively.

10 Claims, 6 Drawing Sheets

(51) Int. Cl.
*G06T 7/60* (2017.01)
*G06T 17/00* (2006.01)

(58) Field of Classification Search
CPC ........... G06K 9/00201; G06K 9/00214; G06K 9/0014
See application file for complete search history.

(56) References Cited

FOREIGN PATENT DOCUMENTS

| | | |
|---|---|---|
| CN | 105590320 A | 5/2016 |
| JP | 2014-203366 A | 10/2014 |
| WO | WO 2014/190037 A1 | 11/2014 |

OTHER PUBLICATIONS

Meng et al.; "Unsupervised co-segmentation for 3D shapes using iterative multi-label optimization"; Computer-Aided Design, vol. 45, Issue 2; Feb. 2013, pp. 312-320.*

Yan, Yi, "Research on Reconstruction, Segmentation and Dimension Extraction of 3D Human Model" Hunan Univesity of Technology Master Thesis Paper; (Apr. 2013).

Hu, Ruizhen et al., "Co-Segmentation of 3D Shapes via Subspace Clustering" Computer Graphics Forum; vol. 31; Issue 5; (Aug. 2012); pp. 1703-1713.

The Chinese First Examination Report of corresponding China patent application No. 201610131316.3, dated Jun. 5, 2018.

* cited by examiner

METHOD FOR CO-SEGMENTATING THREE-DIMENSIONAL MODELS REPRESENTED BY SPARSE AND LOW-RANK FEATURE

CROSS-REFERENCE TO RELATED APPLICATIONS

This application claims priority to Chinese Patent Application No. 201610534020.6, filed on Jul. 7, 2016, which is hereby incorporated by reference in its entirety.

TECHNICAL FIELD

The present disclosure relates to the field of computer graphics technology, and particularly to a method for co-segmenting three-dimensional models represented by sparse and low-rank feature.

BACKGROUND

As computer science and technologies continue to evolve, three-dimensional model processing techniques have become one of the essential parts of daily lives, with applications in film producing, medical treatment, industrial manufacturing and various other domains. As one of the fundamental techniques in three-dimensional model interpretation and processing, three-dimensional model co-segmentation plays a key role in three-dimensional modeling, three-dimensional animation, three-dimensional simulation and many other three-dimensional technologies. Three-dimensional model co-segmentation is about jointly segmenting various parts of individual models in a model class including a plurality of models.

In the prior art, three-dimensional model co-segmentation methods include unsupervised three-dimensional model set joint-segmentation method and interactive three-dimensional model set co-segmentation method, etc. In the unsupervised three-dimensional model set joint-segmentation method, each model of an input model set is initially segmented. Then, the pre-segmented parts of different models are jointly segmented in pairs in order to identify similar parts between the models. Finally, all model parts are globally optimized to obtain a consistent co-segmentation outcome for the three-dimensional model set. In the interactive three-dimensional model co-segmentation method, an initial segmentation outcome is produced through a pre-segmentation. Then, a user preemptively imposes constraints on a small number of models regarding the parts which belong to the same or different classes. The constraints are utilized to optimize further co-segmentation outcomes iteratively, until a consistent segmentation outcome of the three-dimensional model set is obtained.

However, in the prior art, the unsupervised three-dimensional model set joint-segmentation method relies on the initial pre-segmentation outcome. If the part segmentation outcome generated by the pre-segmentation process is inappropriate, nor will the final segmentation outcome be. Meanwhile, since the unsupervised three-dimensional model set joint-segmentation method also relies on correlations among the models, in case any erroneous correlation is introduced due to diversity of the models, erroneous segmentation outcome will consequently be produced. In short, the possibility of obtaining a correct co-segmentation outcome is relatively low. The possibility of obtaining a correct co-segmentation outcome through the interactive three-dimensional model set co-segmentation method is, unfortunately, also relatively low. The cause being that, a small amount of user interaction is required to propagate correct correlations among model parts to other models, yet without a true segmentation outcome as the guidance, teachings from the user interaction still have some limitations in terms of correcting erroneous model part correlations, again making correct segmentation outcome unachievable, and the possibility of obtaining a correct co-segmentation outcome is also relatively low.

SUMMARY

Accordingly, the present disclosure provides a method for co-segmenting three-dimensional models represented by sparse and low-rank feature.

The present disclosure provides a method for co-segmenting three-dimensional models represented by sparse and low-rank feature, the method including:

pre-segmenting each three-dimensional model of a three-dimensional model class to obtain three-dimensional model patches for the each three-dimensional model;

constructing a histogram for the three-dimensional model patches of the each three-dimensional model to obtain a patch feature vector for the each three-dimensional model;

performing a sparse and low-rank representation to the patch feature vector for the each three-dimensional model to obtain a representation coefficient and a representation error of the each three-dimensional model;

determining a confident representation coefficient for the each three-dimensional model according to the representation coefficient and the representation error of the each three-dimensional model; and clustering the confident representation coefficient of the each three-dimensional model to co-segment the each three-dimensional model respectively.

In the aforementioned method, the pre-segmenting each three-dimensional model of a three-dimensional model class to obtain three-dimensional model patches for the each three-dimensional model includes:

obtaining a base geometrical feature combination for the each three-dimensional model of the three-dimensional model class; and determining, by pre-segmenting the base geometrical feature combination of the each three-dimensional model using a NCuts algorithm, the three-dimensional model patches of the each three-dimensional model.

In the aforementioned method, the base geometrical feature combination comprises the following features: a normal vector and a geometric coordinate; and a block number of the three-dimensional model patches of the each three-dimensional model is 50.

In the aforementioned method, the constructing a histogram for the three-dimensional model patches of the each three-dimensional model to obtain a patch feature vector for the each three-dimensional model includes:

determining, by performing a geometric feature value calculation to the each three-dimensional model patch of the each three-dimensional model, a triangle patch feature value combination for the each three-dimensional model patch of the each three-dimensional model, wherein the triangle patch feature value combination comprises at least one triangle patch feature value;

determining, by constructing a histogram for the triangle patch feature value combination of the each three-dimensional model patch of the each three-dimensional model respectively, a feature histogram for the each three-dimensional model patch of the each three-dimensional model; and determining, by arranging feature histograms of all the three-dimensional model patches for the each three-dimensional model, the patch feature vector for the each three-dimensional model.

In the aforementioned method, the triangle patch feature value combination includes: a Shape Diameter Function (SDF) value, a Distance from Medial Surface (DMS) value, an Average Geodesic Distance (AGD) value, and a Shape Context (SC) value.

In the aforementioned method, the performing a sparse and low-rank representation to the patch feature vector for the each three-dimensional model to obtain a representation coefficient and a representation error of the each three-dimensional model includes:

constructing a patch feature vector matrix $D_i=D_k Z_{ki}+E_{ki}$ for a model according to the patch feature vectors of the three-dimensional model, wherein $D_k$ represents the patch feature vector matrix of model k, $Z_{ki}$ represents the representation coefficient, $E_{ki}$ represents the representation error, $i\in[1,n]$, $k\in[1,n]$, and i, n and k are positive integers;

constructing a sparse and low-rank constraint $$\min_{\substack{Z_{k1}, Z_{k2},\ldots,Z_{kn} \\ E_{k1}, E_{k2},\ldots,E_{kn}}} \sum_{i=1}^{n} (\alpha\|Z_{ki}\|_{2,1}+\lambda\|E_{ki}\|_{1,1})+\|ZZ_k\|_*,$$

wherein $Z_{ki} \in ZZ_k$ is a representation coefficient set constructed to represent all models using model k as the dictionary, and $ZZ_k=\{Z_{k1}, Z_{k2}, \ldots, Z_{kn}\}$, $\|\cdot\|_*$ represents a nuclear norm of a matrix, and $\|\cdot\|_*$ is a sum of eigenvalues of a matrix, $\|\cdot\|_{2,1}$ represents $l_{2,1}$ norm, $$\|Z_{ki}\|_{2,1}=\sum_{j=1}^{n*np}\|Z_{ki}(*, j)\|_2,$$

np represents the block number of three-dimensional model patches of each models, $Z_{ki}(*,j)$ represents the j-th column of $Z_{ki}$, $\|\cdot\|_{1,1}$ represents $l_{1,1}$ norm, $\|E\|_{1,1}=\Sigma_{i,j}|E_{i,j}|$, i and j are row index and column index of the matrix E respectively, $j\in[1, n*np]$, j and np are positive integers, and $\alpha$ and $\lambda$ are balancing weight factors;

determining a solution formula $$\min_{\substack{Z_{k1}, Z_{k2},\ldots,Z_{kn} \\ R_{k1}, R_{k2},\ldots,R_{kn} \\ S_{k1}, S_{k2},\ldots,S_{kn} \\ E_{k1}, E_{k2},\ldots,E_{kn}}} \sum_{i=1}^{n} (\alpha\|S_{ki}\|_{2,1}+\lambda\|E_{ki}\|_{1,1})+\|ZZ_k\|_*$$

according to the patch feature vector matrix of each model and the sparse and low-rank constraint, wherein $D_i=D_k R_{ki}+E_{ki}$, $Z_{ki}=S_{ki}$, $Z_{ki}=R_{ki}$, $S_{ki}\geq R_{ki}\geq 0$; and solving the solution formula to obtain each representation coefficient $Z_{ki}$ and each representation error $E_{ki}$ for the each three-dimensional model.

In the aforementioned method, the solving the solution formula to obtain each representation coefficient $Z_{ki}$ and each representation error $E_{ki}$ for the each three-dimensional model includes:

using Augmented Lagrange Multiplier (ALM) method to solve the solution formula, to obtain each representation coefficient $Z_{ki}$ and each representation error $E_{ki}$ for the each three-dimensional model.

In the aforementioned method, the determining a confident representation coefficient for the each three-dimensional model according to the representation coefficient and the representation error of the each three-dimensional model includes:

normalizing all representation errors of the each three-dimensional model to obtain a normalized representation error $EE_i=\{E_{i1}, E_{i2}, \ldots, E_{in}\}$ for the each three-dimensional model, wherein $i\in[1,n]$, and i and n are positive integers;

determining an error sum $$SE_i=\sum_{j=1}^{n*np}|EE_i(*, j)|$$

for the each three-dimensional model according to all the normalized representation errors of the each three-dimensional model, wherein $i\in[1,n]$, $j\in[1,n*np]$, and j and np are positive integers;

normalizing all error sums of the each three-dimensional model to obtain each weight value $NSE_i$ of the each three-dimensional model; and determining each confident representation coefficient $ZZ_{confident_i}=ZZ_i\cdot(1+\exp^{-\beta*NSE_i})$, for the each three-dimensional model according to the each weight value $NSE_i$ and the representation coefficient set $ZZ_i$ of the three-dimensional model, wherein $\beta$ is a control parameter.

In the aforementioned method, the clustering the confident representation coefficients of the each three-dimensional model to co-segment the each three-dimensional model respectively includes:

using a K-means method to cluster the confident representation coefficient of the each three-dimensional model to obtain a co-segmentation outcome for the each three-dimensional model.

In the aforementioned method, after the clustering the confident representation coefficient of the each three-dimensional model to co-segment the each three-dimensional model respectively, further including:

determining, by using a Fuzzy Cuts method to perform boundary smoothing and optimization for the co-segmentation outcome for the each three-dimensional model, an optimized co-segmentation outcome for the each three-dimensional model.

The technical effects of the present disclosure are: pre-segmenting each three-dimensional model of a three-dimensional model class to obtain three-dimensional model patches for the each three-dimensional model; constructing a histogram for the three-dimensional model patches of the each three-dimensional model to obtain a patch feature vector for the each three-dimensional model; performing a sparse and low-rank representation to the patch feature vector for the each three-dimensional model to obtain a representation coefficient and a representation error of the each three-dimensional model; determining a confident representation coefficient for the each three-dimensional model according to the representation coefficient and the representation error of the each three-dimensional model; and clustering the confident representation coefficient of the each three-dimensional model to co-segment the each three-dimensional model respectively. Therefore, a new three-dimensional model co-segmentation method based on sparse and low-rank representation is presented, in which a single three-dimensional model is used as the dictionary for exploring correlations between individual three-dimensional models while preserving global consistency among three-dimensional models of the same class without missing individual features of individual three-dimensional models. Meanwhile, by using the representation error to weight the representation coefficient by level of confidence, representation outcomes of multiple runs may be correctly combined and clustered to obtain the final three-dimensional model co-segmentation outcome with higher accuracy rate.

DESCRIPTION OF EMBODIMENTS

In order to make objectives, technical solutions and advantages of the present disclosure clearer, the technical solutions in the embodiments of the present disclosure will be described hereunder clearly and completely with reference to accompanying drawings in the embodiments of the present disclosure. Obviously, the described embodiments are only a part of embodiments of the present disclosure, rather than all of them. Any other embodiments obtained by persons skilled in the art based on the embodiments of the present disclosure herein without making any creative effort shall fall into the protection scope of the present disclosure.

Figure 1:
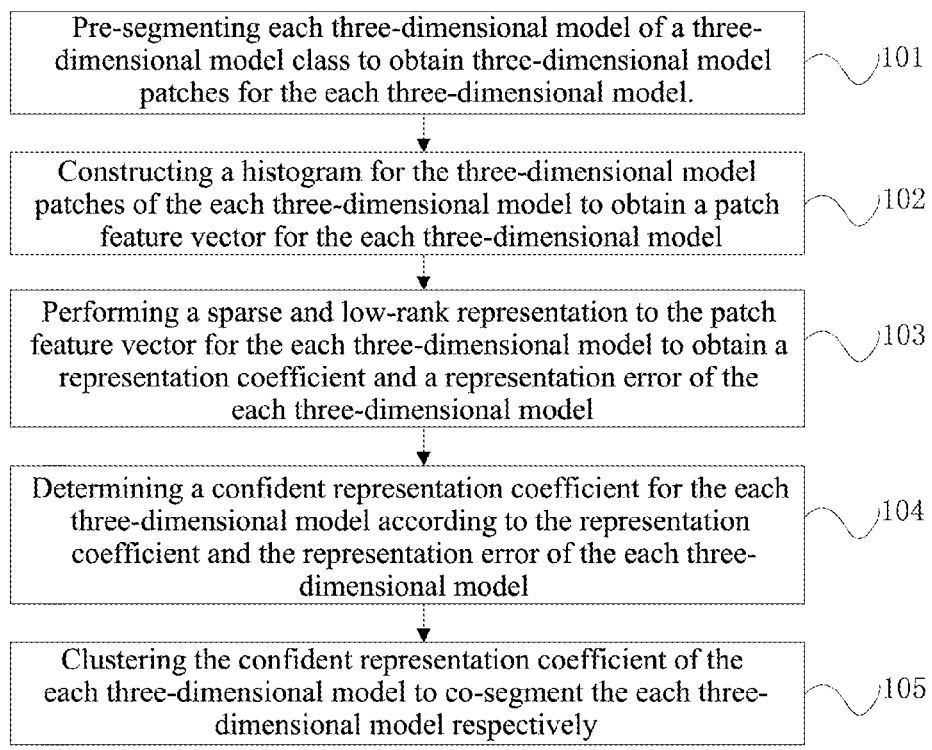
FIG. 1 is a flowchart illustrating a method for co-segmenting three-dimensional models represented by sparse and low-rank feature provided by a first embodiment of the present disclosure.

FIG. 1 is a flowchart illustrating a method for co-segmenting three-dimensional models represented by sparse and low-rank feature provided by a first embodiment of the present disclosure. As depicted in FIG. 1, the present embodiment method includes:

At step 101, pre-segmenting each three-dimensional model of a three-dimensional model class to obtain three-dimensional model patches for the each three-dimensional model.

Figure 2:
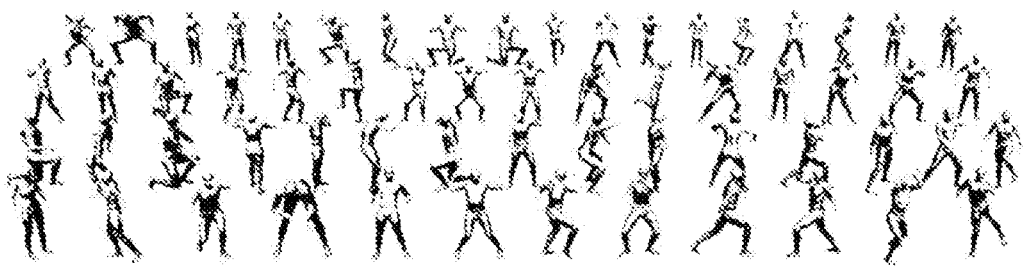
FIG. 2 is a schematic diagram illustrating three-dimensional models of a method for co-segmenting three-dimensional models represented by sparse and low-rank feature provided by the first embodiment of the present disclosure.

In the present embodiment, particularly, a three-dimensional model class has a plurality of three-dimensional models. For example, in a three-dimensional model class of human bodies, as depicted in FIG. 2, a schematic diagram illustrating three-dimensional models of a method for co-segmenting three-dimensional models represented by sparse and low-rank feature provided by the first embodiment of the present disclosure, there is a plurality of human body three-dimensional models. Similarly, a three-dimensional model class of tables may have a plurality of table three-dimensional models, and a three-dimensional model class of cats may have a plurality of cat three-dimensional models. It is desired to segment all three-dimensional models of a three-dimensional model class, so that each three-dimensional model is segmented into several parts. For example, each human body three-dimensional model of a human body class may be co-segmented into parts such as heads, torsos, and limbs.

Firstly, each three-dimensional model of the three-dimensional model class needs to be pre-segmented to obtain three-dimensional model patches for each three-dimensional model. A three-dimensional model patch consists of continuously aggregated three-dimensional model triangle patches. Each three-dimensional model may have a plurality of three-dimensional model patches.

At step 102, constructing a histogram for the three-dimensional model patches of the each three-dimensional model to obtain a patch feature vector for the each three-dimensional model.

In the present embodiment, particularly, a histogram is constructed for three-dimensional model patches of each three-dimensional model respectively. In particular, this may start from extracting geometric features of three-dimensional model patches of the each three-dimensional model, proceed to obtaining SDF value, DMS value, AGD value and SC value for each three-dimensional model patches of the each three-dimensional model, normalizing the calculated geometric feature value for individual three-dimensional model patches of each three-dimensional model, and performing calculation to obtain a histogram of the features of each three-dimensional model patch for each three-dimensional model. Following that, feature histograms of all three-dimensional model patches for each three-dimensional model are rearranged and joined, thus obtaining a patch feature vector for each three-dimensional model.

At step 103, performing a sparse and low-rank representation to the patch feature vector for the each three-dimensional model to obtain a representation coefficient and a representation error of the each three-dimensional model.

In the present embodiment, particularly, feature histograms of all three-dimensional models in a three-dimensional model class may be collected into a dictionary for sparsely representing each model in the three-dimensional model class, i.e. to derive a sparse and low-rank representation of the patch feature vector. Meanwhile, a sparse and low-rank constraint is constructed to make the representation coefficient as low-rank as possible. Finally, calculation is performed to obtain a representation coefficient set and a representation error set for each three-dimensional model, where one representation coefficient set has a plurality of representation coefficients, and one representation error set has a plurality of representation errors.

At step 104, determining a confident representation coefficient for the each three-dimensional model according to the representation coefficient and the representation error of the each three-dimensional model.

In the present embodiment, particularly, representation error of a three-dimensional model may be normalized for each three-dimensional model. The normalized representation error may be taken as the weighting for the representation coefficient corresponding to the representation error. Thus, each representation error is weighted for calculating a confident representation coefficient for each three-dimensional model respectively, where one three-dimensional model has one confident representation coefficient.

At step 105, clustering the confident representation coefficient of the each three-dimensional model to co-segment the each three-dimensional model respectively.

In the present embodiment, particularly, confident representation coefficients of all three-dimensional models are clustered into divisions so that co-segmentation outcome for each three-dimensional model can be obtained. Therefore, each three-dimensional model is divided into several parts consistently grouped into classes. Afterwards, Fuzzy Cuts method may be used to perform boundary smoothing and optimization for the co-segmentation outcome for each three-dimensional model to obtain the final three-dimensional model co-segmentation outcome.

The present embodiment pre-segments each three-dimensional model of a three-dimensional model class to obtain three-dimensional model patches for the each three-dimensional model; constructs a histogram for the three-dimensional model patches of the each three-dimensional model to obtain a patch feature vector for the each three-dimensional model; performs a sparse and low-rank representation to the patch feature vector for the each three-dimensional model to obtain a representation coefficient and a representation error of the each three-dimensional model; determines a confident representation coefficient for the each three-dimensional model according to the representation coefficient and the representation error of the each three-dimensional model; and clusters the confident representation coefficient of the each three-dimensional model to co-segment each three-dimensional model respectively. Therefore, a new three-dimensional model co-segmentation method based on sparse and low-rank representation is presented, in which a single three-dimensional model is used as the dictionary for exploring correlations between individual three-dimensional models while preserving global consistency among three-dimensional models of the same class without missing individual features of individual three-dimensional models. Meanwhile, by using the representation error to weight the representation coefficient by level of confidence, representation outcomes of multiple runs may be correctly combined and clustered to obtain the final three-dimensional model co-segmentation outcome with higher accuracy rate.

Figure 3:
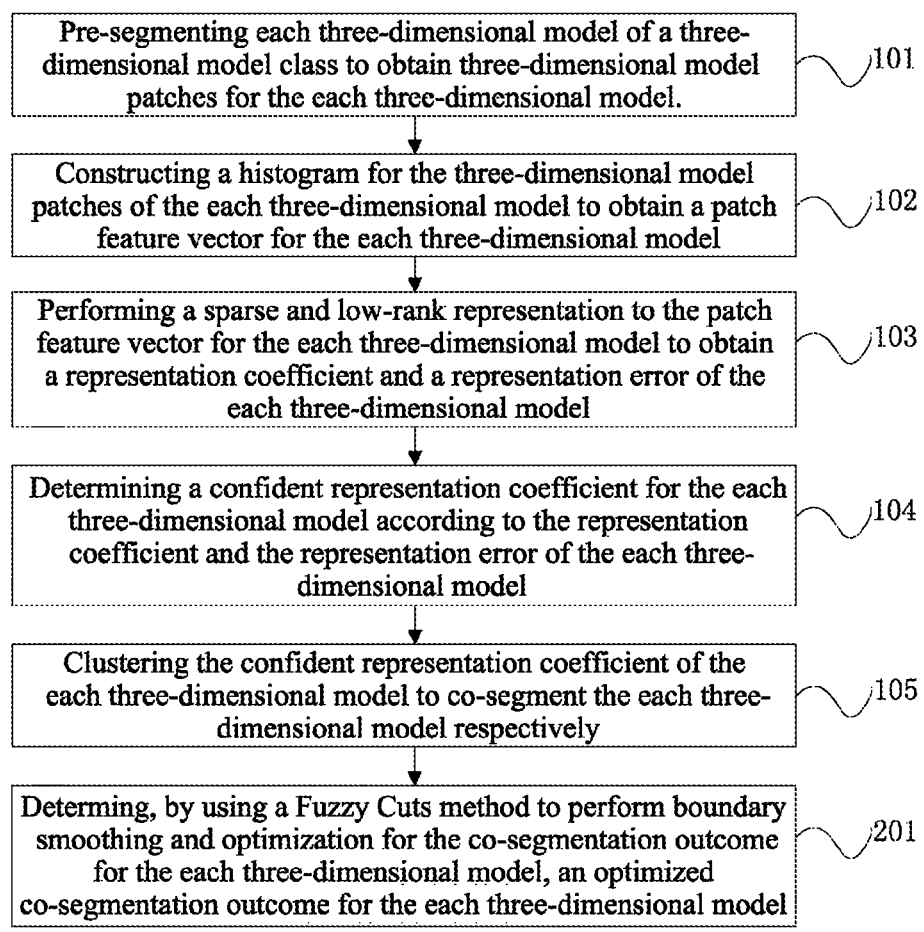
FIG. 3 is a flowchart illustrating a method for co-segmenting three-dimensional models represented by sparse and low-rank feature provided by a second embodiment of the present disclosure.

FIG. 3 is a flowchart illustrating a method for co-segmenting three-dimensional models represented by sparse and low-rank feature provided by a second embodiment of the present disclosure. On the basis of the first embodiment, as depicted in FIG. 3, step 101 in the present embodiment of the method particularly includes:

obtaining a base geometrical feature combination for the each three-dimensional model of the three-dimensional model class; and determining, by pre-segmenting the base geometrical feature combination of the each three-dimensional model using a NCuts algorithm, the three-dimensional model patches of the each three-dimensional model.

Here, the base geometrical feature combination includes the following features: a normal vector, and a geometric coordinate; and a block number of the three-dimensional model patches of the each three-dimensional model is 50.

Figure 4:
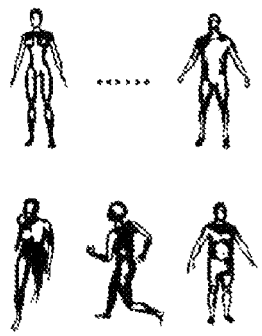
FIG. 4 is a schematic diagram illustrating three-dimensional models of a method for co-segmenting three-dimensional models represented by sparse and low-rank feature provided by the second embodiment of the present disclosure.

In the present embodiment, particularly, FIG. 4 is a schematic diagram illustrating three-dimensional models of the method for co-segmenting three-dimensional models represented by sparse and low-rank feature provided by the second embodiment of the present disclosure. As depicted in FIG. 4, a three-dimensional model class has a plurality of three-dimensional models. The plurality of three-dimensional models in the three-dimensional model class are input into a computer to obtain a base geometrical feature combination for each three-dimensional model, where the base geometrical feature combination includes features such as normal vector and geometric coordinate.

Following that, the base geometrical feature combination of the three-dimensional models may be respectively pre-segmented using NCuts algorithm, so as to pre-segment each three-dimensional model, thus continuously aggregated three-dimensional model patches of each three-dimensional model can be obtained, where the number of three-dimensional model patches for each three-dimensional model is usually set at 50.

Step 102 particularly includes:

determining, by performing a geometric feature value calculation to the each three-dimensional model patch of the each three-dimensional model, a triangle patch feature value combination for the each three-dimensional model patch of the each three-dimensional model, where the triangle patch feature value combination comprises at least one triangle patch feature value;

determining, by constructing a histogram for the triangle patch feature value combination of the each three-dimensional model patch of the each three-dimensional model respectively, a feature histogram for the each three-dimensional model patch of the each three-dimensional model; and determining, by arranging feature histograms of all the three-dimensional model patches for the each three-dimensional model, the patch feature vector for the each three-dimensional model.

Here, the triangle patch feature value combination includes: a Shape Diameter Function (SDF) value, a Distance from Medial Surface (DMS) value, an Average Geodesic Distance (AGD) value, and a Shape Context (SC) value.

Figure 5:
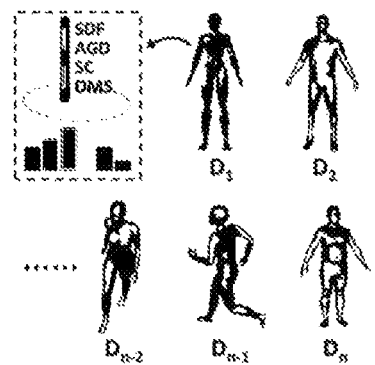
FIG. 5 is a schematic diagram illustrating a geometric feature value calculation for three-dimensional models of a method for co-segmenting three-dimensional models represented by sparse and low-rank feature provided by the second embodiment of the present disclosure.

In the present embodiment, particularly, for each three-dimensional model in a three-dimensional model class, geometric feature value for each three-dimensional model patch of each three-dimensional model needs to be firstly calculated to obtain the triangle patch feature value, e.g. the SDF value, DMS value, AGD value, and SC value, which together form a triangle patch feature value combination for each three-dimensional model patch. FIG. 5 is a schematic diagram illustrating a geometric feature value calculation for a three-dimensional model of the method for co-segmenting three-dimensional models represented by sparse and low-rank feature provided by the second embodiment of the present disclosure. As depicted in FIG. 5, the SDF value, DMS value, AGD value, and SC value of each three-dimensional model patch can be obtained for each model. Then, a histogram is constructed for the triangle patch feature value combination of the each three-dimensional model patch of each three-dimensional model, so as to determine a feature histogram for the each three-dimensional model patch of each three-dimensional model. Since one three-dimensional model has 50 three-dimensional model patches, it can be known that one three-dimensional model has 50 feature histograms. When constructing the histogram, the number of divisions therein is often set at 50.

Finally, feature histograms of all three-dimensional model patches for each three-dimensional model may be arranged so that feature values of all feature histograms of each model are in one column. The arranged feature histograms are taken as the patch feature vector of the three-dimensional model, where each three-dimensional model has a plurality of patch feature vectors.

Step 103 particularly includes:

constructing a patch feature vector matrix $D_i=D_k Z_{ki}+E_{ki}$ for a model according to the patch feature vectors of the three-dimensional model, where $D_k$ represents the patch feature vector matrix of model k, $Z_{ki}$ represents the representation coefficient, $E_{ki}$ represents the representation error, $i \in [1,n]$, $k \in [1,n]$, and i, n and k are positive integers;

constructing a sparse and low-rank constraint $$\min_{\substack{Z_{k1}, Z_{k2}, \ldots, Z_{kn} \\ E_{k1}, E_{k2}, \ldots, E_{kn}}} \sum_{i=1}^{n} (\alpha \|Z_{ki}\|_{2,1} + \lambda \|E_{ki}\|_{1,1}) + \|ZZ_k\|_*,$$

where $Z_{ki} \geq 0$, $ZZ_k$ is a representation coefficient set constructed to represent all models using model k as the dictionary, and $ZZ_k = \{Z_{k1}, Z_{k2}, \ldots, Z_{kn}\}$, $\|\cdot\|_*$ represents a nuclear norm of a matrix, and $\|\cdot\|_*$ is a sum of eigenvalues of a matrix, $\|\cdot\|_{2,1}$ represents $l_{2,1}$ norm, $$\|Z_{ki}\|_{2,1} = \sum_{j=1}^{n*np} \|Z_{ki}(*,j)\|_2,$$

np represents the block number of three-dimensional model patches of each models, $Z_{ki}(*,j)$ represents the j-th column of $Z_{ki}$, $\|\cdot\|_{1,1}$ represents $l_{1,1}$ norm, $\|E\|_{1,1}=\Sigma_{i,j}|E_{i,j}|$, i and j are row index and column index of the matrix E respectively, $j \in [1, n*np]$, j and np are positive integers, and $\alpha$ and $\lambda$ are balancing weight factors;

determining a solution formula $$\min_{\substack{Z_{k1}, Z_{k2}, \ldots, Z_{kn} \\ R_{k1}, R_{k2}, \ldots, R_{kn} \\ S_{k1}, S_{k2}, \ldots, S_{kn} \\ E_{k1}, E_{k2}, \ldots, E_{kn}}} \sum_{i=1}^{n} (\alpha \|S_{ki}\|_{2,1} + \lambda \|E_{ki}\|_{1,1}) + \|ZZ_k\|_*$$

according to the patch feature vector matrix of each model and the sparse and low-rank constraint, where $D_i = D_k R_{ki} + E_{ki}$, $Z_{ki} = S_{ki}$, $Z_{ki} = R_{ki}$, $S_{ki} \geq 0$, $R_{ki} \geq 0$; and solving the solution formula to obtain each representation coefficient $Z_{ki}$ and each representation error $E_{ki}$ for the each three-dimensional model.

Here, the solving the solution formula to obtain each representation coefficient $Z_{ki}$ and each representation error $E_{ki}$ for each three-dimensional model includes:

using Augmented Lagrange Multiplier (ALM) method to solve the solution formula, so as to obtain each representation coefficient $Z_{ki}$ and each representation error $E_{ki}$ for the each three-dimensional model.

In the present embodiment, particularly, for each three-dimensional model in a three-dimensional model class, when patch feature vectors of the three-dimensional models have been obtained, all patch feature vectors of model k may be joined, thus obtaining a patch feature vector matrix $D_k$ for model k. Then, based on each patch feature vector of each three-dimensional model, formula of patch feature vector matrix $D_i = D_k Z_{ki} + E_{ki}$ is obtained for each model, where $Z_{ki}$ represents the representation coefficient, $E_{ki}$ represents the representation error, $i \in [1,n]$, $k \in [1,n]$, i, and n and k are positive integers. For now, representation coefficient $Z_{ki}$ and representation error $E_{ki}$ are unknowns.

For the purpose of obtaining a tightly consistent correlation among the models, the present embodiment needs to construct a sparse and low-rank constraint $$\min_{\substack{Z_{k1}, Z_{k2}, \ldots, Z_{kn} \\ E_{k1}, E_{k2}, \ldots, E_{kn}}} \sum_{i=1}^{n} (\alpha \|Z_{ki}\|_{2,1} + \lambda \|E_{ki}\|_{1,1}) + \|ZZ_k\|_*,$$

where $Z_{ki} \geq 0$, $ZZ_k$ is a representation coefficient set constructed to represent all models using model k as the dictionary, and $ZZ_k = \{Z_{k1}, Z_{k2}, \ldots, Z_{kn}\}$, $\|\cdot\|_*$ represents a nuclear norm of a matrix, and is the sum of eigenvalues of a matrix, $\|\cdot\|_{2,1}$ represents $l_{2,1}$ norm;

$$\|Z_{ki}\|_{2,1} = \sum_{j=1}^{n*np} \|Z_{ki}(*,j)\|_2,$$

np represents the number of three-dimensional model patches of each models, $Z_{ki}(*,j)$ represents the j-th column of $Z_{ki}$, $\|\cdot\|_{1,1}$ represents $l_{1,1}$ norm, $\|E\|_{1,1}=\Sigma_{i,j}|E_{i,j}|$, i and j are row index and column index of the matrix E respectively, $j \in [1, n*np]$, j and np are positive integers, and $\alpha$ and $\lambda$ are balancing weight factors.

Then, for each model, equivalent transformation is performed on the patch feature vector matrix $D = D_k Z_{ki} + E_{ki}$ and the sparse and low-rank constraint $$\min_{\substack{Z_{k1}, Z_{k2}, \ldots, Z_{kn} \\ E_{k1}, E_{k2}, \ldots, E_{kn}}} \sum_{i=1}^{n} (\alpha \|Z_{ki}\|_{2,1} + \lambda \|E_{ki}\|_{1,1}) + \|ZZ_k\|_*$$

to obtain a solution formula $$\min_{\substack{Z_{k1}, Z_{k2}, \ldots, Z_{kn} \\ R_{k1}, R_{k2}, \ldots, R_{kn} \\ S_{k1}, S_{k2}, \ldots, S_{kn} \\ E_{k1}, E_{k2}, \ldots, E_{kn}}} \sum_{i=1}^{n} (\alpha \|S_{ki}\|_{2,1} + \lambda \|E_{ki}\|_{1,1}) + \|ZZ_k\|_*,$$

where the $D_i = D_k R_{ki} + E_{ki}$, $Z_{ki} = S_{ki}$, $Z_{ki} = R_{ki}$, $S_{ki} \geq 0$, $R_{ki} \geq 0$, $i \in [1, n]$, $k \in [1,n]$, and i, n and k are positive integers.

Then, ALM method is used to solve the described solution formula $$\min_{\substack{Z_{k1},Z_{k2},\ldots,Z_{kn} \\ R_{k1},R_{k2},\ldots,R_{kn} \\ S_{k1},S_{k2},\ldots,S_{kn} \\ E_{k1},E_{k2},\ldots,E_{kn}}} \sum_{i=1}^{n} (\alpha\|S_{ki}\|_{2,1} + \lambda\|E_{ki}\|_{1,1}) + \|ZZ_k\|_*,$$

to obtain, for each three-dimensional model, each representation coefficient $Z_{ki}$, and the one representation error $E_{ki}$ correspondent to each one of the representation coefficients $Z_{ki}$. It is known that one three-dimensional model may have a plurality of representation coefficients and representation errors, with one-on-one correspondence between the representation coefficient and the representation error.

Figure 6:
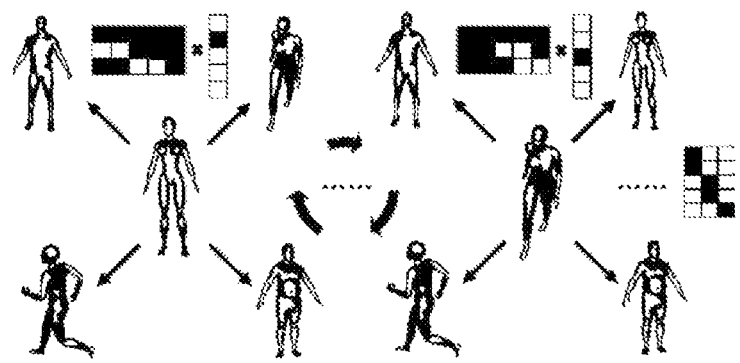
FIG. 6 is a schematic diagram illustrating a sparse and low-rank feature representation calculation for three-dimensional models of a method for co-segmenting three-dimensional models represented by sparse and low-rank feature provided by the second embodiment of the present disclosure.

FIG. 6 is a schematic diagram illustrating a sparse and low-rank feature representation calculation for a three-dimensional model of the method for co-segmenting three-dimensional models represented by sparse and low-rank feature provided by the second embodiment of the present disclosure. As depicted in FIG. 6, individual three-dimensional models in a three-dimensional model class may be used as the dictionary to obtain a sparse and low-rank representation for all the three-dimensional models in the three-dimensional model class. Then, the each representation coefficient $Z_{ki}$, and the one representation error $E_{ki}$ correspondent to each one of the representation coefficients $Z_{ki}$, are calculated.

Step 104 particularly includes:

normalizing all representation errors of the each three-dimensional model to obtain a normalized representation error $EE_i=\{E_{i1}, E_{i2}, \ldots, E_{in}\}$ for the each three-dimensional model, where $i \in [1,n]$, and i and n are positive integers;

determining an error sum $$SE_i = \sum_{j=1}^{n*np} |EE_i(*, j)|$$

for the each three-dimensional model according to all the normalized representation errors of the each three-dimensional model, where $i \in [1,n]$, $j \in [1,n*np]$, and j and np are positive integers;

normalizing all error sums of the each three-dimensional model to obtain each weight value $NSE_i$ of the each three-dimensional model; and determining each confident representation coefficient $ZZ_{confident_i}=ZZ_i \cdot (1+\exp^{-\beta*NSE_i})$, for the each three-dimensional model according to the each weight value $NSE_i$ and the representation coefficient set $ZZ_i$ of the three-dimensional model, where $\beta$ is a control parameter.

In the present embodiment, particularly, a method to weight a coefficient by confidence is presented, which allows assessing and weighting the obtained representation coefficients by using the representation errors, so that reliable confident representation coefficients can be obtained.

In particular, firstly, all representation errors $E_{ki}$ of each three-dimensional model are normalized to obtain a normalized representation error $EE_i=\{E_{i1}, E_{i2}, \ldots, E_{in}\}$ for each three-dimensional model, where $i \in [1,n]$, and i and n are positive integers.

Figure 7:
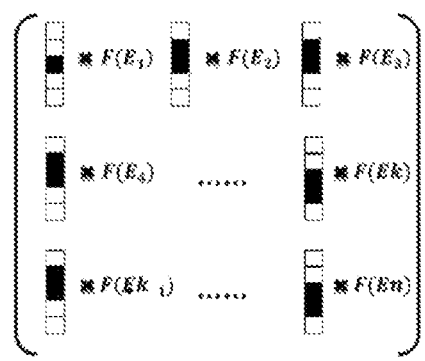
FIG. 7 is a schematic diagram illustrating a sparse confidence weighting calculation for three-dimensional models of a method for co-segmenting three-dimensional models represented by sparse and low-rank feature provided by the second embodiment of the present disclosure.

Then, as depicted in FIG. 7, which is a schematic diagram illustrating a sparse confidence weighted calculation for a three-dimensional model of the method for co-segmenting three-dimensional models represented by sparse and low-rank feature provided by the second embodiment of the present disclosure, an error sum $$SE_i = \sum_{j=1}^{n*np} |EE_i(*, j)|$$

for each column of each three-dimensional model may be calculated according to all the normalized representation errors $EE_i=\{E_{i1}, E_{i2}, \ldots, E_{in}\}$ of each three-dimensional model, where $i \in [1,n]$, $j \in [1,n*np]$, and j and np are positive integers.

Following that, all error sums $SE_i$ of each three-dimensional model are normalized to obtain each weight value $NSE_i$. Then, each confident representation coefficient $ZZ_{confident_i}=ZZ_i \cdot (1+\exp^{-\beta*NSE_i})$ for each three-dimensional model is solved according to the each weight value $NSE_i$ and the representation coefficient set $ZZ_i$. The $\beta$ is a control parameter. In general, $\beta$ takes the value of 5.

Step 105 particularly includes:

using a K-means method to cluster the confident representation coefficient of the each three-dimensional model to obtain a co-segmentation outcome for the each three-dimensional model.

In the present embodiment, particularly, confident representation coefficients of all three-dimensional models are clustered into divisions by the K-means method, so that co-segmentation outcome for each three-dimensional model can be obtained. By now, each three-dimensional model of a three-dimensional model class has been segmented into a plurality of parts consistently grouped into classes.

For example, each of the plurality of human body three-dimensional models of a human body class is segmented into a plurality of parts, such as heads, torsos, and limbs, without incorrectly segmenting the parts.

Following step 105, further includes:

At step 201, determining, by using a Fuzzy Cuts method to perform boundary smoothing and optimization for the co-segmentation outcome for the each three-dimensional model, an optimized co-segmentation outcome for the each three-dimensional model.

Figure 8:
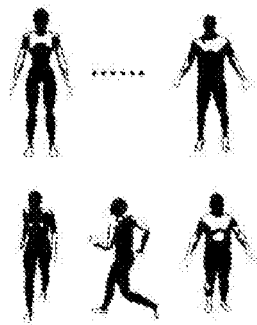
FIG. 8 is a schematic diagram illustrating co-segmentation outcome for three-dimensional models of a method for co-segmenting three-dimensional models represented by sparse and low-rank feature provided by the second embodiment of the present disclosure.

In the present embodiment, particularly, after the step 105, an initial co-segmentation outcome is obtained for each three-dimensional model of a three-dimensional model class. By now, for each three-dimensional model, a Fuzzy Cuts method is required to perform boundary smoothing and optimization for the co-segmentation outcome for each three-dimensional model in step 105. FIG. 8 is a schematic diagram illustrating a co-segmentation outcome for three-dimensional models of the method for co-segmenting three-dimensional models represented by sparse and low-rank feature provided by the second embodiment of the present disclosure. As depicted in FIG. 8, the final three-dimensional model co-segmentation outcome is obtained. That is, an optimized co-segmentation outcome for each three-dimensional model of a three-dimensional model class is obtained, ensuring correctness of the co-segmentation.

The present embodiment pre-segments each three-dimensional model of a three-dimensional model class to obtain three-dimensional model patches for the each three-dimensional model; constructs a histogram for the three-dimensional model patches of the each three-dimensional model to obtain a patch feature vector for the each three-dimensional model; performs a sparse and low-rank representation to the patch feature vector for the each three-dimensional model to obtain a representation coefficient and a representation error of the each three-dimensional model; determines a confident representation coefficient for the each three-dimensional model according to the representation coefficient and the representation error of the each three-dimensional model; clusters the confident representation coefficients of the each three-dimensional model to co-segment each three-dimensional model respectively; and uses Fuzzy Cuts method to perform boundary smoothing and optimization for the co-segmentation outcome for each three-dimensional model to determine an optimized co-segmentation outcome for each three-dimensional model. Therefore, a new three-dimensional model co-segmentation method based on sparse and low-rank representation is presented, in which a single three-dimensional model is used as the dictionary for exploring correlations between individual three-dimensional models while preserving global consistency among three-dimensional models of the same class without missing individual features of individual three-dimensional models. Meanwhile, by using the representation error to weight the representation coefficient by level of confidence, representation outcomes of multiple runs may be correctly combined and clustered to obtain the final three-dimensional model co-segmentation outcome with higher accuracy rate.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disc.

Lastly, it should be noted that the foregoing embodiments are merely intended for explaining, rather than limiting, the technical solutions of the present disclosure. Although the present disclosure is explained in detail with reference to the foregoing embodiments, persons of ordinary skill in the art should understand that it remains possible to make modifications to the technical solutions described in the foregoing embodiments, or make equivalent replacements to some of the technical features therein, and these modifications or replacements do not make the essence of corresponding technical solutions depart from the spirit and scope of the technical solutions in the embodiments of the present disclosure.

What is claimed is:

1. A method for co-segmenting three-dimensional models represented by sparse and low-rank feature, comprising:
   pre-segmenting each three-dimensional model of a three-dimensional model class to obtain three-dimensional model patches for the each three-dimensional model;
   constructing a histogram for the three-dimensional model patches of the each three-dimensional model to obtain a patch feature vector for the each three-dimensional model;
   performing a sparse and low-rank representation to the patch feature vector for the each three-dimensional model to obtain a representation coefficient and a representation error of the each three-dimensional model;
   determining a confident representation coefficient for the each three-dimensional model according to the representation coefficient and the representation error of the each three-dimensional model; and
   clustering the confident representation coefficient of the each three-dimensional model to co-segment the each three-dimensional model, respectively.

2. The method according to claim 1, wherein the pre-segmenting each three-dimensional model of a three-dimensional model class to obtain three-dimensional model patches of the each three-dimensional model comprises:
   obtaining a base geometrical feature combination for the each three-dimensional model of the three-dimensional model class; and
   determining, by pre-segmenting the base geometrical feature combination of the each three-dimensional model using a NCuts algorithm, the three-dimensional model patches of the each three-dimensional model.

3. The method according to claim 2, wherein the base geometrical feature combination comprises the following features: a normal vector and a geometric coordinate; and
   a block number of the three-dimensional model patches of the each three-dimensional model is 50.

4. The method according to claim 1, wherein the constructing a histogram for the three-dimensional model patches of the each three-dimensional model to obtain a patch feature vector for the each three-dimensional model comprises:
   determining, by performing a geometric feature value calculation to the each three-dimensional model patch of the each three-dimensional model, a triangle patch feature value combination for the each three-dimensional model patch of the each three-dimensional model, wherein the triangle patch feature value combination comprises at least one triangle patch feature value;
   determining, by constructing a histogram for the triangle patch feature value combination of the each three-dimensional model patch of the each three-dimensional model respectively, a feature histogram for the each three-dimensional model patch of the each three-dimensional model; and
   determining, by arranging feature histograms of all the three-dimensional model patches for the each three-dimensional model, the patch feature vector for the each three-dimensional model.

5. The method according to claim 4, wherein the triangle patch feature value combination comprises: a Shape Diameter Function (SDF) value, a Distance from Medial Surface (DMS) value, an Average Geodesic Distance (AGD) value and a Shape Context (SC) value.

6. The method according to claim 1, wherein the performing a sparse and low-rank representation to the patch feature vector for the each three-dimensional model to obtain a representation coefficient and a representation error of the each three-dimensional model comprises:
   constructing a patch feature vector matrix $D_i = D_k Z_{ki} + E_{ki}$ for a model according to the patch feature vectors of the three-dimensional model, wherein $D_k$ represents the patch feature vector matrix of model k, $Z_{ki}$ represents the representation coefficient, $E_{ki}$ represents the representation error, $i \in [1,n]$, $k \in [1,n]$, and i, n and k are positive integers;
   constructing a sparse and low-rank constraint $$\min_{\substack{Z_{k1}, Z_{k2}, \ldots, Z_{kn} \\ E_{k1}, E_{k2}, \ldots, E_{kn}}} \sum_{i=1}^{n} (\alpha \|Z_{ki}\|_{2,1} + \lambda \|E_{ki}\|_{1,1}) + \|ZZ_k\|_*,$$

wherein $Z_{ki} \geq 0$, $ZZ_k$ is a representation coefficient set constructed to represent all models using model k as the dictionary, and $ZZ_k = \{Z_{k1}, Z_{k2}, \ldots, Z_{kn}\}$, $\|\cdot\|_*$ represents a nuclear norm of a matrix, and $\|\cdot\|_*$ is a sum of eigenvalues of a matrix, $\|\cdot\|_{2,1}$ represents $l_{2,1}$ norm, $$\|Z_{ki}\|_{2,1} = \sum_{j=1}^{n*np} \|Z_{ki}(*,j)\|_2,$$

np represents the block number of the three-dimensional model patches of each models, $Z_{ki}(*,j)$ represents the j-th column of $Z_{ki}$, $\|\cdot\|_{1,1}$ represents $l_{1,1}$ norm, $\|E\|_{1,1} = \Sigma_{i,j}|E_{i,j}|$, i and j are row index and column index of the matrix E respectively, $j \in [1, n*np]$, j and np are positive integers, and $\alpha$ and $\lambda$ are balancing weight factors;

determining a solution formula $$\min_{\substack{Z_{k1}, Z_{k2}, \ldots, Z_{kn} \\ R_{k1}, R_{k2}, \ldots, R_{kn} \\ S_{k1}, S_{k2}, \ldots, S_{kn} \\ E_{k1}, E_{k2}, \ldots, E_{kn}}} \sum_{i=1}^{n} (\alpha \|S_{ki}\|_{2,1} + \lambda \|E_{ki}\|_{1,1}) + \|ZZ_k\|_*$$

according to the patch feature vector matrix of each model and the sparse and low-rank constraint, wherein $D_i = D_k R_{ki}$ $E_{ki}$, $Z_{ki} = S_{ki}$, $Z_{ki} = R_{ki}$, $S_{ki} \geq 0$, $R_{ki} \geq 0$; and solving the solution formula to obtain each representation coefficient $Z_{ki}$ and each representation error $E_{ki}$ for the each three-dimensional model.

7. The method according to claim 6, wherein the solving the solution formula to obtain each representation coefficient $Z_{ki}$ and each representation error $E_{ki}$ for the each three-dimensional model comprises:

using Augmented Lagrange Multiplier (ALM) method to solve the solution formula, to obtain each representation coefficient $Z_{ki}$ and each representation error $E_{ki}$ for the each three-dimensional model.

8. The method according to claim 1, wherein the determining a confident representation coefficient for the each three-dimensional model according to the representation coefficient and the representation error of the each three-dimensional model comprises:

normalizing all representation errors of the each three-dimensional model to obtain a normalized representation error $EE_i = \{E_{i1}, E_{i2}, \ldots, E_{in}\}$ for the each three-dimensional model, wherein $i \in [1, n]$, and i and n are positive integers;

determining an error sum $$SE_i = \sum_{j=1}^{n*np} |EE_i(*,j)|$$

for the each three-dimensional model according to all the normalized representation errors of the each three-dimensional model, wherein $i \in [1, n]$, $j \in [1, n*np]$, and j and np are positive integers;

normalizing all error sums of the each three-dimensional model to obtain each weight value $NSE_i$ of the each three-dimensional model; and determining each confident representation coefficient $ZZ_{confident_i} = ZZ_i \cdot (1 + \exp^{-\beta * NSE_i})$ for the each three-dimensional model according to the each weight value $NSE_i$ and the representation coefficient set $ZZ_i$ of the three-dimensional model, wherein $\beta$ is a control parameter.

9. The method according to claim 1, wherein the clustering the confident representation coefficient of the each three-dimensional model to co-segment the each three-dimensional model respectively comprises:

using a K-means method to cluster the confident representation coefficient of the each three-dimensional model to obtain a co-segmentation outcome for the each three-dimensional model.

10. The method according to claim 1, wherein after the clustering the confident representation coefficient of the each three-dimensional model to co-segment the each three-dimensional model respectively, further comprising:

determining, by using a Fuzzy Cuts method to perform boundary smoothing and optimization for the co-segmentation outcome for the each three-dimensional model, an optimized co-segmentation outcome for the each three-dimensional model.

* * * * *